June 4, 1957 R. B. DOME 2,794,912

FREQUENCY MODULATION DETECTOR

Filed Sept. 23, 1953

Inventor:
Robert B. Dome,
by Donald N. Timbie
His Attorney.

2,794,912
Patented June 4, 1957

2,794,912

FREQUENCY MODULATION DETECTOR

Robert B. Dome, Geddes Township, Onondaga County, N. Y., assignor to General Electric Company, a corporation of New York Application September 23, 1953, Serial No. 381,881

4 Claims. (Cl. 250—25)

This invention relates to a circuit for detecting the intelligence conveyed by a frequency modulated wave.

Generally, detectors of this type have employed diodes as the non-linear elements but they are expensive and do not inherently limit high amplitude pulses of noise.

Accordingly, it is an object of this invention to provide a detector for frequency modulated signals that does not use diodes.

It is another object of the invention to provide a frequency modulation detector that is relatively unaffected by noise impulses.

These objectives as well as other advantages may be attained by biasing symmetrically conductive non-linear resistive elements in such manner that they can perform the rectifying functions formerly carried out by the diodes. Without such bias, a symmetrically conductive element would conduct equal amounts of current in both directions when the polarity of the voltage applied across it is reversed. Whereas it has been known for a long time that the efficiency of non-linear resistive elements such as SiC crystals is increased by suitable biasing, it has not been suggested that symmetrically conductive non-linear resistance elements could be used in a frequency modulation detector. The effects of noise are reduced because the maximum output of the biased symmetrically conductive non-linear resistive element is limited to the biasing voltage.

For additional objects and advantages, and for a better understanding of my invention, attention is now directed to the following detailed description and the accompanying drawings in which.

Figure 1:
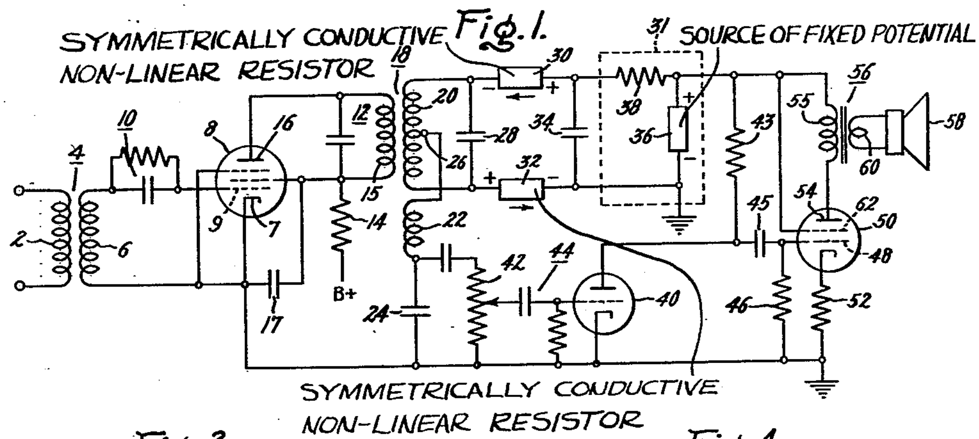
Figure 1 is a schematic representation of a circuit constructed in accordance with the principles of this invention.

In Figure 1, a frequency modulated carrier wave from a source not shown is applied across the primary 2 of a transformer 4. One end of the secondary 6 is connected to a cathode 7 of an amplifier 8, and the other end is coupled to a grid 9 of the amplifier by a parallel resistor condenser combination 10 that provides biasing potential for the amplifier in the usual manner. As is well known, a biasing potential obtained in this manner varies with the amplitude of the applied signal so that the amplifier 8 operates to some extent as a limiter. A circuit 12 that is in parallel resonance at the central frequency of the carrier wave is connected in series with a resistor 14 between a plate 16 of the amplifier 8 and a source of B+ voltage. The Q of the circuit 12 is such that appreciable voltages appear across it for any normal frequency of the F. M. carrier wave. A bypass condenser 17 is connected from the junction of circuit 12 and resistor 14 to the cathode 7 of device 8.

The inductive branch 15 of the tuned circuit 12 also serves as the primary of a transformer 18 having a secondary winding 20 and a tertiary winding 22. The secondary 20 and tertiary 22 are so arranged that there is little or no coupling between them and each is energized by magnetic coupling to the primary 15. One end of the tertiary winding 22 is effectively grounded for carrier wave frequencies by a condenser 24. However, for reasons which will subsequently be explained the condenser 24 is small enough to present a substantial impedance for audio frequencies. The other end of the tertiary winding 22 is connected to a center tap 26 on the secondary winding 20. The secondary winding 20 is tuned to resonance at the central frequency of the carrier wave by a shunt condenser 28. To one skilled in the art, it will be apparent that the transformer 18 functions in much the same manner as the transformer used in the well known ratio detector, i. e., when the carrier wave is at its central frequency, the alternating current voltages from the extreme of each half of the secondary 20 to ground are equal in amplitude, but when the carrier wave deviates from the central frequency, the voltage from the extreme of one half of the secondary 20 to ground is larger in amplitude than the voltage from the extreme of the other half to ground. For any given winding polarities, the half of the secondary extremity having the larger voltage of carrier frequency with respect to ground depends on whether the carrier is above or below its central frequency. As the vector analysis for proving these facts is well known, it is not believed necessary to consider it in detail.

Figure 2:
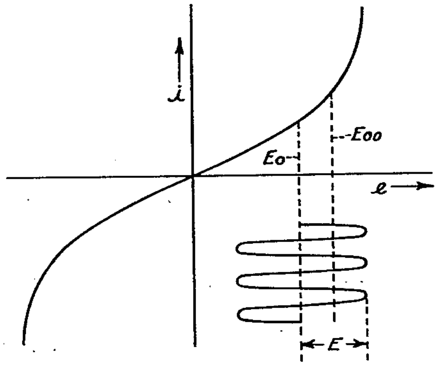
Figure 2 is a graph illustrating the current vs. voltage characteristics of a symmetrically conductive non-linear resistive element.

In accordance with the invention, a symmetrical non-linear resistive element 30 having a voltage drop vs. current characteristic as illustrated in Figure 2, is connected between one end of the secondary 20 and the positive side of a source 31 (here shown as a dotted rectangle) of fixed potential. A similar symmetrical non-linear resistive element 32 is connected between the other end of the secondary winding 20 and the negative side of the source 31, which may be grounded as shown. The source 31 is bypassed by a suitable condenser 34 so as to complete a loop for the carrier wave frequencies. If the source 31 is comprised of an unregulated source 36 of D. C. potential, it may be advisable to insert a voltage regulating resistor 38 between its positive terminal and the non-linear resistive element 30. In this case, the condenser 34 should bypass both the audio and the carrier wave frequencies. However, if the source 31 is regulated, for example, if it were a battery, the voltage regulating resistor 38 could be dispensed with and the condenser 34 could be made smaller so as to bypass only the carrier wave frequencies.

The circuit just set forth operates in a manner to be described to produce the desired audio signal at the center tap of the secondary winding 20. The tertiary winding has little impedance at audio frequencies but it will be remembered that the condenser 24 has a substantial impedance for audio frequencies so that the audio signal appears across it. However, the size of the condenser 24 is such that carrier wave frequencies present in the circuit produce a negligible amount of voltage across the condenser 24.

The audio signal across the condenser 24 is coupled to the grid of a driven amplifier 40 via a volume control 42 and the usual grid coupling circuit 44. The plate of the amplifier 40 may be energized from any suitable D. C. source but in this particular example it is connected via a plate load resistor 43 to the positive terminal of the source 36. The amplified audio signal appearing at the plate of the driven amplifier 40 is coupled by a condenser 45 and a grid leak resistor 46 to a control grid 48 of a power amplifier 50. Suitable bias for the power amplifier is derived across a cathode resistor 52. The plate 54 of the power amplifier 50 is connected via a primary 55 of an audio output transformer 56 to a point of suitable operating potential such as the positive terminal of the source 36. The audio signal is coupled to the actuating coil of a speaker 58 via the secondary winding 60 of the audio output transformer 56. The screen grid 62 of the power amplifier 50 may also be connected to the positive terminal of the source 36. It will be understood by those skilled in the art that the audio signal could be coupled from the center tap of the secondary winding 20 to the speaker 58 by circuits different from that just described wihout interfering with the basic operation of the frequency modulation detecting circuit that is the subject of the present invention.

The manner in which the circuitry including the non-linear resistive elements 30 and 32 operates to produce the audio signal at the center tap of the secondary winding 20 may be generally explained as follows:

If no carrier wave is present, the resistance of the elements 30 and 32 have equal maximum values. When a carrier wave having the same frequency as the resonant frequency of the secondary 20 is present, the amplitudes of the waves of carrier frequencies between each end of the secondary 20 and ground are equal. For reasons which will subsequently be explained in detail, the resistance of each of the elements 30 and 32 is lowered to an intermediate value that is a function of the amplitude of the carrier wave. When the frequency of the carrier wave deviates in one direction from its central value, the amplitude of the wave of carrier frequency appearing at one end of the secondary winding 20 with respect to ground increases with the result that the average resistance of the symmetrically conductive non-linear resistive element coupled to that end is lowered. At the same time the amplitude of the wave of carrier frequency appearing at the other end of the secondary with respect to ground is decreased so that the average resistance of the symmetrically conductive non-linear resistive element connected to it is increased. This causes a shift in the potential at the center tap 26 in a given direction. Now if the frequency of the carrier wave deviates in the opposite direction from its central frequency, the relative amplitudes of the carrier waves at the ends of the secondary winding with respect to ground are interchanged so that the end formerly having the larger carrier wave amplitude now has the smaller amplitude and vice versa. The relative values of the resistances of the elements 30 and 32 are now reversed so that the element formerly having the larger resistance now has the smaller resistance and vice versa. This causes the average voltage at the center tap 26 to shift in the opposite direction. Hence, as the frequency of the carrier wave deviates about its central frequency in accordance with the audio signal the relative resistance of the elements 30 and 32 and consequently the voltage of the center tap 26 shifts in like manner.

Figure 5:
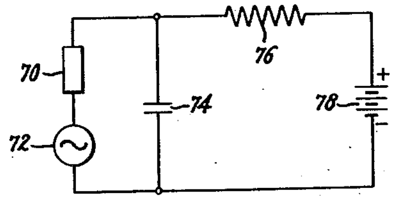
Figure 5 is a simplified schematic diagram of a portion of the circuit shown in Figure 1 and is used for explanatory purposes.

The following explanation of the theory of operation of this invention is made in conjunction with the simplified circuit shown in Figure 5. In this circuit a symmetrical non-linear resistive element 70 is connected in series with a source 72 of alternating current. A bypass condenser 74 for the frequency of the waves provided by the source 72 is connected in parallel with the symmetrical non-linear element 70 and the source 72. In parallel with the condenser 74 there is connected the series combination of a resistor 76 and a source of E. M. F., here shown as a battery 78. This circuit corresponds to part of the circuit of Figure 1, the battery 78, the resistor 76 and the condenser 74 performing the same functions as the source of E. M. F. 36, the resistor 38 and the condenser 34. The element 70 may correspond to the element 30 and the source 72 to the high frequency potential present between ground and one end of the upper half of the secondary 20. In the circuit of Figure 5, the path from the lower side of the source 72 to the negative terminal of the battery has no impedance for either carrier or carrier modulation frequencies. In the circuit of Figure 1, the tertiary winding 22 has a high impedance to carrier frequencies. However, inasmuch as the following discussion of Figure 5 is directed toward explaining the manner in which the resistance of the element 70 varies with the modulation frequencies, the omission of the impedance of the tertiary winding 22 from the diagram is of no significance. As a matter of fact, this impedance could be considered as the internal impedance of the source 72.

It will now be shown how the symmetrically conductive non-linear resistive element 70 performs as a detector of radio frequency. As noted above the voltage existing between one extremity of secondary 20 of Figure 1 and ground is replaced here by a generator 72 having a terminal voltage of sinusoidal character (1) $$e_s = E \sin \omega t$$

Also, let the resultant D. C. voltage across condenser 74 be called $E_0$. Then the total voltage applied to non-linear element 70 is (2) $$e = E_0 + e_s = E_0 + E \sin \omega t$$

The instantaneous current which flows through device 70 is therefore (3) $$i = Ke^n = K(E_0 + E \sin \omega t)^n$$

where $n$=an exponent expressing the non-linearity of device 70.

From Fourier harmonic analysis, the direct current component of $i$ is given by the standard equation (4) $$i_0 = \frac{1}{2\pi} \int_0^{2\pi} K(E_0 + E \sin \phi)^n d\phi$$

where $\omega t$ has been replaced by $\phi$ to shorten the notation. When $n$ is any number in general, the integral becomes difficult to evaluate because of the infinite series resulting from the binominal expansion. For this reason, a typical value for $n$ will be assumed so as to obtain a finite series. The value selected for this analysis is (5) $$n = 3$$

Substituting this value for $n$ in Equation 4, and carrying out the indicated integration, and substituting the limits in the integrand, there results for the D. C. current (6) $$i_0 = KE_0^3\left(1 + \frac{3E^2}{2E_0^2}\right)$$

Now if the signal voltage is zero, as when receiving no signal at all, the value of $E_0$ is established at its initial value $E_{00}$ and the direct current at its initial value of $i_{00}$. By Ohm's law, from Figure 5, (7) $$i_{00} = \frac{E_{78} - E_{00}}{R_{76}}$$

But in Equation 6, if $E=0$, (8) $$i_{00} = KE_0^3 \equiv KE_{00}^3$$

From Equation 8 K may be evaluated as (9) $$K = \frac{i_{00}}{E_{00}^3}$$

Substituting the value for $i_{00}$ as given in Equation 7 into Equation 9, $$(10)\qquad K=\frac{E_{78}-E_{00}}{R_{76}E_{00}^3}$$

Also, in Figure 5, from Ohm's law, $$(11)\qquad i_0=\frac{E_{78}-E_0}{R_{76}}$$

Substituting both Equation 10 for K and Equation 11 for $i_0$ in Equation 6, $$(12)\qquad \frac{E_{78}-E_0}{R_{76}}=\frac{(E_{78}-E_{00})}{R_{76}E_{00}^3}E_0^3\left(1+\frac{3}{2}\frac{E^2}{E_0^2}\right)$$

The $R_{76}$ factor drops out, and Equation 12 may be written as an equation in powers of $E_0$ as $$(13)\qquad \frac{(E_{78}-E_{00})}{E_{00}^3}E_0^3+\left[\frac{3}{2}\frac{(E_{78}-E_{00})}{E_{00}^3}E^2+1\right]E_0-E_{78}=0$$

This equation may be solved for $E_0$. However, in order to simplify the solution, the following assumption is made:

$$(14)\qquad E_{78}>>E_0,\ E,\ E_{00}$$

This is true because in the practical circuit $E_{78}$ may be 250 volts where $E_0$, E, and $E_{00}$ may be expected to lie in the range below 10 volts.

Equation 13 therefore, may be simplified by assuming $E_{78}\rightarrow\infty$ to $$(15)\qquad E_0^3+\frac{3}{2}E^2E_0-E_{00}^3=0$$

From the mathematical tables section of the Handbook of Chemistry and Physics, the solution to Equation 15 is given by $$(16)\qquad E_0=\frac{E_{00}}{\sqrt[3]{2}}\left[\sqrt[3]{1+\sqrt{1+\frac{1}{2}\left(\frac{E}{E_{00}}\right)^6}}+\sqrt[3]{1-\sqrt{1+\frac{1}{2}\left(\frac{E}{E_{00}}\right)^6}}\right]$$

Thus, given the initial bias $E_{00}$ and the amplitude of the signal voltage E, the resultant D. C. potential $E_0$ may be determined. A general solution can be made if the variable $E_0$ is changed to $$\frac{E_0}{E_{00}}$$

by dividing both sides of Equation 16 by $E_{00}$. Then Equation 16 is of the form $$(17)\qquad \frac{E_0}{E_{00}}=\frac{1}{\sqrt[3]{2}}\left[\sqrt[3]{1+\sqrt{1+\frac{1}{2}\left(\frac{E}{E_{00}}\right)^6}}+\sqrt[3]{1-\sqrt{1+\frac{1}{2}\left(\frac{E}{E_{00}}\right)^6}}\right]$$

Figure 3:
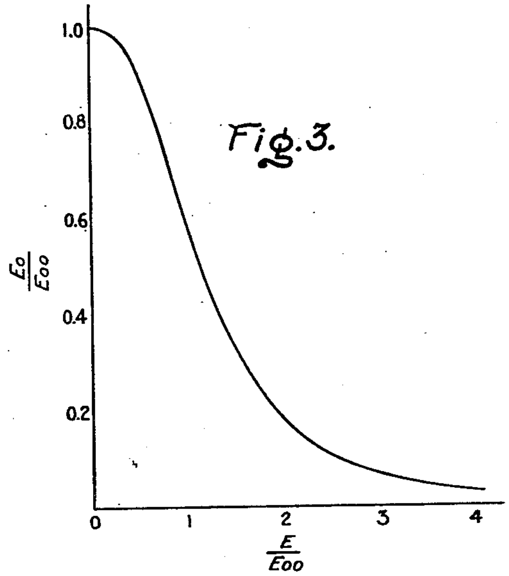
Figure 3 is a graph used in explaining the operation of the invention and illustrating the effect of applying combined alternating and fixed potentials to a symmetrically conductive non-linear resistive element.

The function represented by Equation 17 is shown plotted as Figure 3. Since the current through the element is essentially constant because $R_{76}$ is the predominate resistance in the circuit and it is a fixed linear resistor, the resistance of the non-linear element 70 will follow exactly the same curve as $$\frac{E_0}{E_{00}}$$

Thus, as the signal E increases, the resistance of the non-linear element decreases.

Referring now to Figure 1 of the drawing, it will be observed that there are two non-linear elements in series instead of just one as used in the explanation of the detector action. These two elements are 30 and 32. The connection between the elements is secondary winding 20. This winding, in association with tertiary winding 22 and primary winding 15, performs the function of providing a signal voltage to elements 30 and 32 such that as the frequency of the signal voltage is varied about its central value, the two elements 30 and 32 receive unlike signal voltage amplitudes. When one voltage increases the other decreases, and vice versa. Based on the detector theory just explained, this change in frequency causes corresponding decreases and increases in the low frequency potential drop across elements 30 and 32 respectively, and vice versa, because of the element resistance changes. Thus, even though condenser 34 be great enough in capacitance to prevent audio frequency changes thereacross, i. e., great enough so that the sum of the drops across elements 30 and 32 is held constant, the potential of the junction between elements 30 and 32 will fluctuate with the applied frequency.

An examination of the graph of Figure 3 reveals that the output of this detector is limited to the range between zero and the initial bias $E_{00}$ regardless of the magnitude of the signal E. On the other hand, there is an extended range between $$\frac{E}{E_{00}}=0.25$$

and $$\frac{E}{E_{00}}=1.75$$

that may be usefully employed for detection. In normal design, therefore, the unmodulated carrier amplitude should place the operation at a mid-point position such as at a point near $$\frac{E}{E_{00}}=1.0$$

Now as the amplitude of $$\frac{E}{E_{00}}$$

varies up and down from 1.0 as the result of modulation, a corresponding change (reversed in polarity) will take place in the low frequency voltage drop across the element.

In an FM circuit, the band-width of transformer 18 is made purposely wider than the maximum FM swing. Therefore, the maximum modulation of the waves applied to elements 30 and 32 will be less than 100% modulated. A value of 50% may be expected. Consequently, there is no danger of non-linear distortion to the signal as the result of the curvature of the characteristic of Figure 3. On the other hand, an excessive noise impulse arising from any cause, could never produce much of an output pulse because of the limited range of output voltages available.

Figure 4:
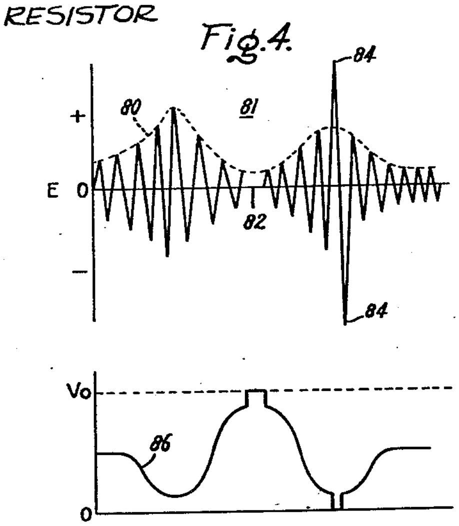
Figure 4 is comprised of two graphs, one showing a typical alternating current input signal having noise holes and peaks and the other showing the effects of the noise on the output signal of the frequency modulation detector of this invention.

With this understanding of the operation, the manner in which the FM discriminator of this invention reduces the effects of noise may be understood. Assume that the carrier wave amplitude at one end of the secondary 20 varies gradually in accordance with an audio signal as indicated by the dotted line 80 graph 81 of Figure 4 and that its amplitude is reduced abruptly to zero at a noise hole 82 and is increased to an extremely high value at peaks 84. The voltage across the element is, for reasons previously explained, inversely proportional to the amplitude of the carrier wave as indicated by the curve 86 of Figure 4, which is seen to be 180° out of phase with the dotted line 80. During the noise hole 82, the carrier wave amplitude is reduced to zero so that the bias voltage across the element must be $E_{00}$. A noise hole, therefore, can never increase the voltage across the element to a value greater than $E_{00}$ so that the effect of the noise hole is limited. The effect of noise peaks such as 84 is also limited because even if they are infinite in amplitude, they can only reduce the voltage across the element to zero. This can be realized from an examination of Figure 3.

Although many materials or devices having the required general characteristic illustrated in Figure 2 are known, the following have been used successfully—thyrite (SiC), magnetite ($Fe_3O_4$), conductive rubber and neon glow lamps (General Electric type NE–2).

The transformer 18 is merely one means for applying a frequency modulated carrier wave to each of the non-linear resistive elements in phase opposition and in such manner that the relative amplitude of the out-of-phase waves depends on the frequency of the carrier wave with respect to its central value. Any other means for performing this function may be substituted for the transformer 18.

In the illustrated embodiment of the invention, the tertiary winding 22 functions to apply the voltage appearing at the plate 16 to the mid-point of the secondary winding 20. As is well known to those skilled in the art a condenser could also be used for this purpose. In this case, the inductor 22 would not be coupled to primary 15 but would serve simply as a choke coil. A coupling condenser, not shown, in this case would be connected from anode 16 to center tap 26 on winding 20.

The transformer 18 provides at opposite ends terminals of the secondary winding carrier waves that are out of phase and which have relative amplitudes depending on the frequency of the carrier wave with respect to a central value. The secondary winding 20 presents little impedance for audio frequencies represented by the frequency variations of the carrier wave and, therefore, they may be recovered at any point on the secondary instead of at center tap as shown. It would, of course, be possible to insert an impedance in parallel with the secondary winding 20 and connect the audio output lead to a point on the parallel impedance. If this were done, the impedance would have to be high enough at carrier frequencies to prevent undue loading of the secondary 20. If at the same time, the impedance were high to audio frequencies, the sensitivity of the detector would be impaired. Hence, it is preferable to connect the output circuit to the center tap of secondary winding 20 through a radio frequency impedance such as inductance 22.

While I have illustrated a particular embodiment of my invention, it will of course be understood that I do not wish to be limited thereto, since various modifications both in the circuit arrangement and in the instrumentalities may be made, and I contemplate by the appended claims to cover any such modifications as fall within the true spirit and scope of the invention.

What I claim as new and desire to secure by Letters Patent of the United States is:

1. A frequency discriminator comprising in combination a source of fixed potential having positive and negative terminals, a bypass condenser connected between said terminals, a first symmetrically conductive non-linear resistive element having one end connected to said positive terminal, a second symmetrically conductive non-linear resistive element having one end connected to said negative terminal, and means for applying a frequency modulated carrier wave to each of the other ends of said elements in phase difference, the relative amplitudes of the phases depending on the frequency of the carrier wave with respect to its central value.

2. A frequency discriminator for recovering a signal corresponding to the change in frequency of a carrier wave comprising in combination a transformer having a primary winding, a secondary winding and a tertiary winding, said windings being so arranged that said secondary and tertiary windings each receive substantially all of their energy from said primary winding, a condenser connected in parallel with said primary winding so as to tune it to a predetermined frequency, a condenser connected in parallel with said secondary winding so as to tune it to resonance at said predetermined frequency, a source of fixed potential having positive and negative terminals, a bypass condenser connected between said terminals, a first symmetrically conductive non-linear resistive element connected between one end of said secondary winding and said positive terminal, a second symmetrically conductive non-linear resistive element connected between the other end of said secondary winding and said negative terminal, means connecting one end of said tertiary winding to an intermediate point on said secondary winding, and a condenser connected between the other end of said tertiary winding and said negative terminal, the impedance of said last mentioned condenser being low for carrier frequencies and high for carrier modulation frequencies.

3. A circuit for recovering intelligence from a frequency modulated carrier wave comprising in combination means responsive to the frequency modulated wave for deriving at different terminals separate carrier waves of a different phase, the carrier waves at the respective terminals having relative amplitudes determined by the frequency of the carrier wave with respect to a central value, means for providing a fixed potential, said means having positive and negative terminals, a first symmetrically conductive non-linear resistive element coupled between one terminal of said source and the positive terminal of said means, a second symmetrically conductive non-linear resistive element coupled between the other terminal of said source and the negative terminal of said means, and an output circuit coupled to a point between said elements on the side including said source.

4. A circuit for recovering an audio signal from a frequency modulated carrier wave comprising in combination a discriminator transformer having primary and secondary windings, a source of fixed potential having positive and negative terminals, a first symmetrically conductive non-linear resistive impedance element connected between one end of said secondary winding and said positive terminal, and a second symmetrically conductive non-linear resistive impedance element connected between the other end of said secondary winding and said negative terminal.

References Cited in the file of this patent

UNITED STATES PATENTS

| | | |
|---|---|---|
| 767,971 | Stone | Aug. 16, 1904 |
| 2,097,937 | Rust | Nov. 2, 1937 |
| 2,476,311 | Learned | July 19, 1949 |
| 2,497,840 | Seeley | Feb. 14, 1950 |
| 2,561,089 | Anderson | July 17, 1951 |
| 2,601,384 | Goodrich | June 24, 1952 |
| 2,653,230 | Moses | Sept. 22, 1953 |

FOREIGN PATENTS

| | | |
|---|---|---|
| 218,361 | Great Britain | June 27, 1924 |

OTHER REFERENCES

Seeley et al.: "The Ratio Detector," RCA Review, June 1947.